United States Patent
Horikiri

(10) Patent No.: US 7,814,559 B2
(45) Date of Patent: Oct. 12, 2010

(54) TELECONFERENCE SYSTEM, ON-SITE SERVER, MANAGEMENT SERVER, TELECONFERENCE MANAGEMENT METHOD AND PROGAM

(75) Inventor: Kazunori Horikiri, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1202 days.

(21) Appl. No.: 11/045,270

(22) Filed: Jan. 31, 2005

(65) Prior Publication Data

US 2006/0069656 A1 Mar. 30, 2006

(30) Foreign Application Priority Data

Sep. 24, 2004 (JP) ............... 2004-276555

(51) Int. Cl.
 *G06F 7/04* (2006.01)
(52) U.S. Cl. ............ 726/28; 726/2; 726/3; 726/4; 726/27; 713/150; 713/168
(58) Field of Classification Search ........... 713/150, 713/168; 726/2–6, 27–28
See application file for complete search history.

(56) References Cited

U.S. PATENT DOCUMENTS

| | | | |
|---|---|---|---|
| 5,107,443 A * | 4/1992 | Smith et al. | 715/751 |
| 6,002,768 A * | 12/1999 | Albanese et al. | 713/175 |
| 6,496,201 B1 * | 12/2002 | Baldwin et al. | 715/753 |
| 6,564,261 B1 * | 5/2003 | Gudjonsson et al. | 709/227 |
| 6,584,493 B1 * | 6/2003 | Butler | 709/204 |
| 6,711,264 B1 * | 3/2004 | Matsumoto et al. | 380/283 |
| 6,772,335 B2 * | 8/2004 | Curtis et al. | 713/163 |
| 6,813,714 B1 * | 11/2004 | Hardjono et al. | 726/14 |
| 7,474,634 B1 * | 1/2009 | Webster et al. | 370/261 |
| 2002/0029350 A1 * | 3/2002 | Cooper et al. | 713/200 |
| 2002/0136382 A1 * | 9/2002 | Cohen et al. | 379/202.01 |
| 2002/0143960 A1 * | 10/2002 | Goren et al. | 709/229 |
| 2003/0014488 A1 * | 1/2003 | Dalal et al. | 709/204 |
| 2005/0198140 A1 * | 9/2005 | Itoh et al. | 709/205 |
| 2006/0053194 A1 * | 3/2006 | Schneider et al. | 709/204 |

FOREIGN PATENT DOCUMENTS

JP      A 2004-21501      1/2004

* cited by examiner

*Primary Examiner*—Edan Orgad
*Assistant Examiner*—Yin-Chen Shaw
(74) *Attorney, Agent, or Firm*—Oliff & Berridge, PLC

(57) ABSTRACT

A teleconference system includes an on-site server provided in a site to control a device in the site, and a management server that connects sites to generate a shared workspace. The shared workspace manages a task that realize collaboration between on-site servers, and the on-site server generates a session key to connect to the on-site server and registers the session key in the shared workspace, when the on-site server uses the shared workspace. Thus, it enhances the security and improves the usability.

10 Claims, 12 Drawing Sheets

IC CARD 2

CARD READER 13, 23

| USER NAME | USER ID | AUTHENTICATION DATA | COMPANY DEPARTMENT | POSITION | AUTHENTICATION INFORMATION |
|---|---|---|---|---|---|
| A. SMITH | ABC-123-456 | XYZ | ENGINEERING DEVELOPMENT | MANAGER | LEVEL A-1 |
|  | GROUP ID | CONFERENCE ID | RESEARCH THEME | | ... |
|  | 212-333-458 022-111-987 | ABC-EFG-IJK XYZ-125-HIJ | UBIQUITOUS | | ... |

FIG. 6A

| USER ID | PERSONAL FILE |
|---|---|
| ABC-123 | 58-056.ppt   ab123.doc |
| 900-600 | 123.ppt |
| ⋮ | ⋮ |

FIG. 6B

| CONFERENCE ID | SHARED FILE |
|---|---|
| 012-345A | 00-000.ppt   abc.doc |
| 987-654C | 123.ppt |
| ⋮ | ⋮ |

MEETING ROOM A

MEETING ROOM B

MEETING ROOM B

MEETING ROOM A

MEETING ROOM B

MEETING ROOM A

MEETING ROOM B

MEETING ROOM A

MEETING ROOM B

MEETING ROOM A

MEETING ROOM B

MEETING ROOM A

MEETING ROOM B

TELECONFERENCE SYSTEM, ON-SITE SERVER, MANAGEMENT SERVER, TELECONFERENCE MANAGEMENT METHOD AND PROGAM

BACKGROUND OF THE INVENTION

1. Field of the Invention

This invention relates to a teleconference system that connects multiple places in separate locations to realize collaborative activities.

2. Description of the Related Art

These days, the network computing technology that interconnects computers has increasingly been required. It is possible to share computer resources and deliver information in a quick and efficient manner, by connecting computers over a network.

Videoconference or teleconference system, for example, can be described as a system that realizes the collaborative activities performed by multiple attendees or participants via a network. With the videoconference system, video and audio are sent and received between the meeting rooms in separate locations so that a meeting can be held while watching attendees displayed on a TV screen in each site. It is thus possible to move through the agenda as if the attendees were meeting in the same room, although, in reality, the attendees attend the meeting in geographically distant meeting rooms. That is, each of the attendees does not have to move or travel to attend the meeting. This makes it possible to make an effective use of time and lower travel costs.

Generally, the videoconference system is composed of input and output devices, encoding and decoding devices for video and audio, a communication device for interconnecting places, and telephone lines. The input and output devices include a camera, a microphone, a monitor, a speaker, and the like. Electric blackboards are provided in the respective meeting rooms so that the participants may write into the respective blackboards. An application is shared to operate in the respective meeting rooms so that data can be shared between the meeting rooms in separate locations.

Japanese Patent Application No. 2004-21501 (hereinafter referred to as Document 1) discloses a videoconference system, in which multiple information terminals, a management server, a data server, and a repeating device. The multiple information terminals are equipped with wireless LAN connection capabilities. The data server stores data for meetings. The repeating device, which repeats a parameter for the wireless LAN connection, is connected to the management server and the data server via a network. When an organizer or owner of the meeting reserves a meeting room, reserved date and time are registered, and the management server determines the parameter for the wireless LAN connection for the meeting. When the reserved time comes, the management server changes the parameter for the wireless LAN connection to the parameter that was determined at the reservation.

The videoconference system disclosed in Document 1, however, requires time and efforts. The organizer of the meeting has to notify the parameter for the wireless LAN connection to the attendees in advance, and has to register the attendees in the management server.

SUMMARY OF THE INVENTION

The present invention has been made in view of the above circumstances and provides a videoconference system, on-site server, management server, teleconference management method, and program, while enhancing security and improving usability.

According to one aspect of the present invention, preferably, there is provided a teleconference system including an on-site server provided in a site to control a device in the site, and a management server that connects a plurality of sites to generate a shared workspace, the shared workspace that manages a task to realize collaboration between a plurality of the on-site servers. The on-site server generates a session key and registers the session key in the shared workspace to be connected by another on-site server. When using the shared workspace managed by the management server, the session key is generated and registered to connect to the on-site server. Another on-site server that is achieving the collaboration is able to obtain the session key to connect to the on-site server. Also, it is impossible to connect to the on-site serve without acquiring the session key. It is thus impossible for a third party having malicious motives to access the on-site server without permission and obtain meeting materials.

According to another aspect of the present invention, preferably, there is provided an on-site server that controls a device provided in a site includes a first part that generates a session key that is used for accessing the on-site server; and a second part that registers the session key in a management server that manages collaboration between a plurality of the on-site servers. Another on-site server, which is to perform the collaboration with the on-site server, is capable of accessing the management server and obtaining the session key to access the on-site server.

A management server that manages collaboration between on-site servers, preferably includes a management server that manages collaboration between a plurality of on-site servers in respective sites, the management server includes a first part that connects between the on-site servers over a network, the on-site servers that controls a device provided in the respective sites, a second part that generates a shared workspace to manage a task that realizes collaboration between the on-site servers, and a third part that registers a session key in the shared workspace, the session key being transferred from an on-site server that uses the shared workspace, and the session key being used for connecting to the on-site server.

According to another aspect of the present invention, preferably, there is provided a teleconference management method of an on-site server that controls a device provided in a site, the method includes generating a session key that is used for accessing the on-site server, and registering the session key in a management server that manages a task to realize collaboration between on-site servers. When using the shared workspace, the session key to access the shared workspace server is registered in the shared workspace. Another on-site server, which is to perform the collaboration with the on-site server, is capable of accessing the management server and obtaining the session key to access the on-site server.

According to another aspect of the present invention, preferably, there is provided a storage medium readable by a computer to execute a process that an on-site server controls a device provided in a site, the process includes generating a session key that is used for accessing the on-site server; and registering the session key in a management server that manages tasks to realize collaboration between on-site servers.

BRIEF DESCRIPTION OF THE DRAWINGS

Embodiments of the present invention will be described in detail based on the following figures, wherein:

FIGS. 6A and 6B show configurations of a management table of a personal file database 32 and a shared file database 33, which are connected to the shared workspace server 30;

DESCRIPTION OF THE EMBODIMENTS

A description will now be given, with reference to the accompanying drawings, of embodiments of the present invention.

First Embodiment

Figure 1:
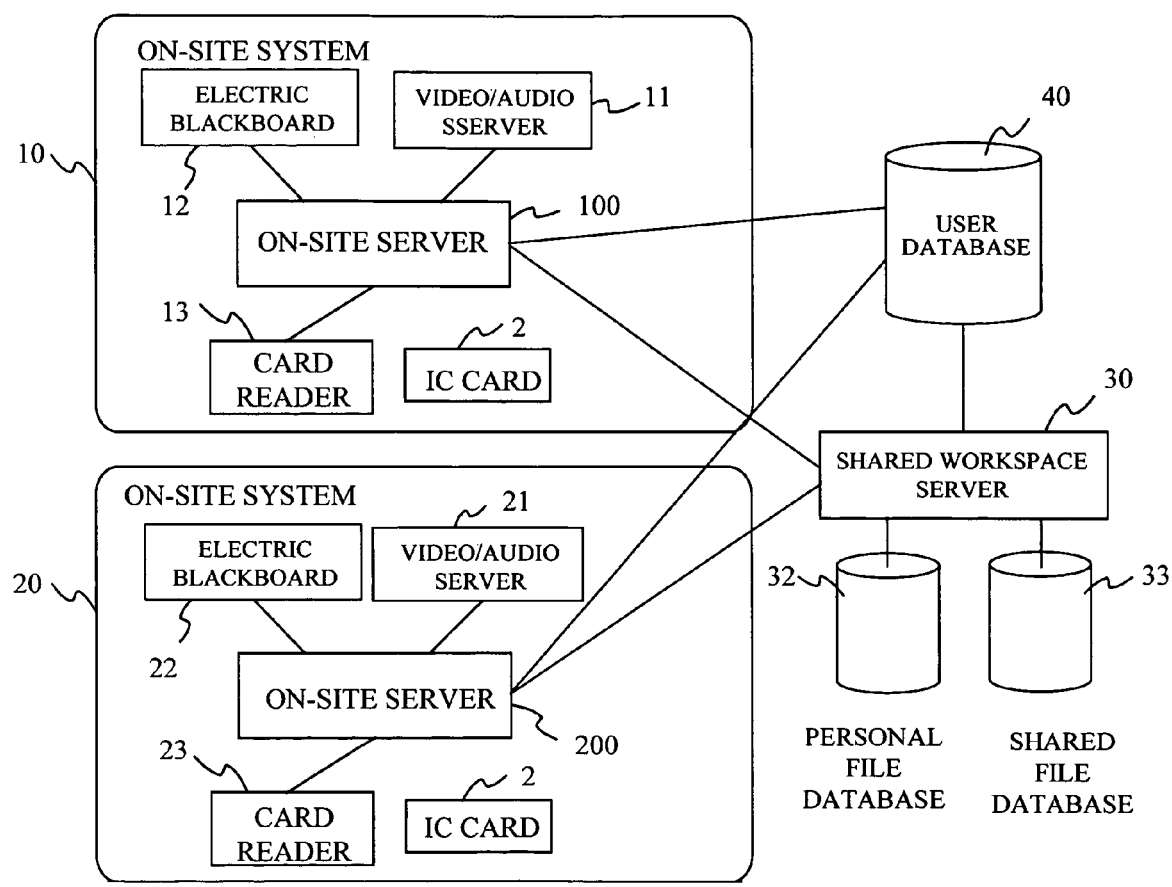
FIG. 1 shows a teleconference system 1 in accordance with a first embodiment of the present invention.

FIG. 1 shows a teleconference system 1 in accordance with a first embodiment of the present invention. Referring to FIG. 1, the teleconference system 1 includes two on-site systems 10 and 20 that are respectively connected by way of a shared workspace server 30. For simplification of the drawing, the shared workspace server 30 is connected to the two on-site systems 10 and 20 as shown in FIG. 1. However, this interconnection is not limited to a one-to-one connection. Three or more sites may be interconnected. The teleconference system 1 includes a user database 40 that stores information on users. The user database 40 is connected to an on-site server 100 in the on-site system 10, an on-site server 200 in the on-site system 20, and the shared workspace server 30. The shared workspace server 30 is not a multipoint connection unit which is located at the center in a star network that connects systems with a communication path used in a circuit switching system such as telephone lines. As will be described later in detail, the shared workspace server 30 is configured to control and manage a session that controls the connection between the on-site systems, a file that is created to be used in the meeting or created as a record, reference information of the resource that is related to the meeting such as URL (Uniform Resource Locator), and access history information of a file or the like performed by the meeting attendees.

The teleconference system 1, in which a workspace is shared, is capable of realizing the following processes so as to support a collaborative activity between geographically distant places.

(1) A prompt connection with another participant of collaboration (2) A prompt download of a document required for the collaboration (3) A prompt shift of collaboration results to the next step The teleconference system 1 provides each site with a modality and a combination of modalities that are necessary for the collaborative activity. For instance, the file such as voice or a presentation document, the electric blackboard, and the video of the attendees are delivered, and remote collaboration editing is packaged for utilization.

The teleconference system 1 adapts an individual workspace to an individual workgroup in each site by offering the document related to the collaborative activity and automatically connecting to the attendees of the collaborative activity.

The teleconference system 1 performs a linkage between a real-time collaboration and a non-real-time collaboration. That is, the real-time collaboration is stored, for example, a presentation document using the electric blackboard is stored, so as to link to the non-real-time collaboration. Documents are associated with the real-time collaboration so as to link the non-real-time collaboration.

Operation procedures of the teleconference system 1, in which a workspace is shared, are schematically described as follows.

(1) When a user starts using the teleconference system 1, an authentication of the user is conducted by the user database 40 with an IC card 2.

(2) The shared workspace to be offered by the shared workspace server 30 is selected or newly created (log into the shared workspace). The user logs into the system and selects the shared workspace by operating a GUI.

(3) The user recognizes who is sharing the shared workspace now or who is communicating in the on-site system, after logging into the shared workspace.

(4) When the user select "meeting", the user is able to attend the videoconference in the site. Multiple meetings may be listed on the selection of the meeting, such as a general meeting, a separate meeting, and the like.

(5) The document may be stored in the shared workspace so as to refer to the document at the meeting or store images shown on the electric blackboard at the meeting.

(6) The shared workspace has a layered structure, and is linked to one another by hyperlinks.

(7) The user is able to participate in the shared workspace, while referring to a sub workspace.

(8) The user operates the shared workspace and discloses information to the shared workspace, by drug and drop from the individual workspace.

Next, a description will be given of videoconference devices included in the teleconference system 1. The on-site systems 10 and 20 are respectively equipped with the videoconference devices for carrying out the videoconference. The on-site systems 10 and 20 operate separately and individually. The on-site systems 10 and 20 may be configured based on the conventional videoconference system. For instance, the on-site systems 10 and 20 are respectively equipped with video/audio servers 11 and 21 to input and output images and voices of the cameras, microphones, monitors, and speakers. Then, the video/audio servers 11 and 21 encode and decode the images and voices to communicate with another on-site system. Thus, movements and behaviors of the attendee are shared with another attendee in another site.

In addition, the on-site systems 10 and 20 respectively include electric blackboards 12 and 22 so that users can write in each site. Further, the application is shared by the on-site systems for operation. In accordance with the first embodiment of the present invention, the Graphical User Interface (GUI) is offered on the electric blackboard 12 and 22 in the shared workspace. The attendees of the meeting are able to connect to the teleconference system to access the information such as a file related to the meeting by operating the GUI. This will be described later.

The attendees of the meeting in each site are the users of the teleconference system 1. The attendees of the meeting operate the GUI offered in the shared workspace. This makes it possible to connect to a multimedia communication conference system without concerning about call addresses from the respective multimedia communication conference systems and access the file related to the meeting easily from the teleconference system.

Figures 2, 3:
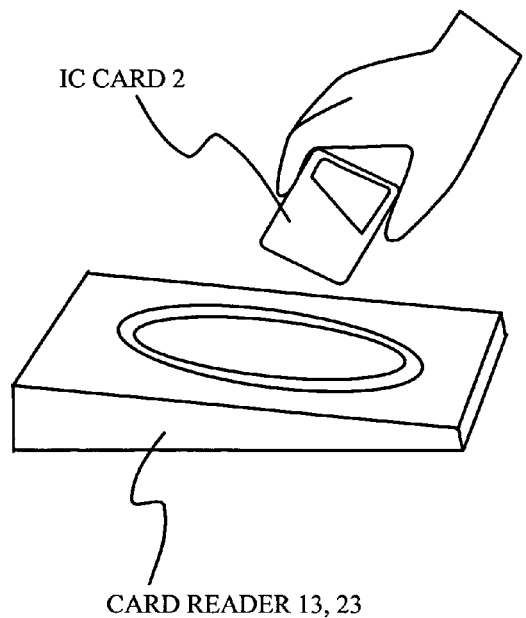
FIG. 2 illustrates that a user holds up an IC card 2 thereof for card readers 13 or 23 to read.
FIG. 3 shows authorization information included in the IC card 2.

Each user carries the IC card 2 as a personal authentication medium, in accordance with the first embodiment of the present invention. The on-site system 10 includes a card reader 13 and the on-site systems 20 includes a card reader 23 to read the user information and authentication information stored in the IC card 2. The user holds up the IC card 2 thereof for the card readers 13 or 23 to read, as shown in FIG. 2. Referring to FIG. 3, the IC card 2 stores, for example, a user name, a user ID to identify the user, authentication data used for authentication, a company department of the user, a position of the user, authorization information that allows the user to access a meeting material or attend the meeting, a group ID for identifying the group that the user belongs to, a conference ID for identifying the conference or meeting that the user has ever attended, a subject of research, and the like. The card readers 13 and 23 read necessary data for authentication, and transfers to the user database 40 via the on-site servers 100 or 200. The authentication data will be described as a public key of the user, which has been issued by a certification organization.

When the public key is transferred from the on-site servers 100 or 200 as the authentication data of the user, the user database 40, for example, authenticates the user based on a private key that corresponds to the above-mentioned public key. If the user is successfully authorized, the user database 40 notifies the corresponding on-site servers 100 or 200 that the authentication has been done, and sends certification data for certifying that the user is an authorized user, to the corresponding on-site servers 100 or 200.

Figure 4:
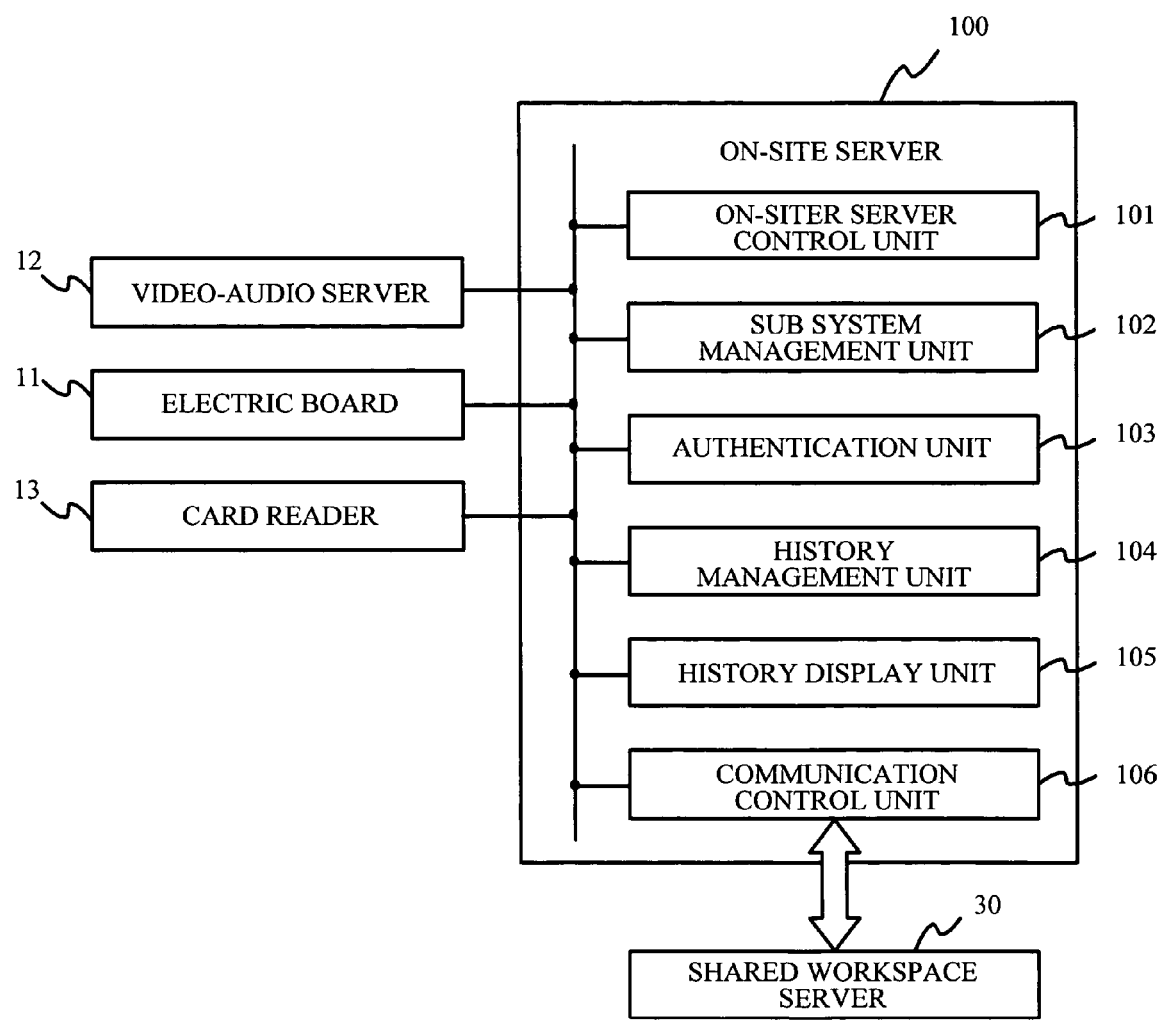
FIG. 4 schematically shows a configuration of an on-site server 100 so as to manage and control a meeting such as the videoconference in an on-site system 10.

Next, a description will be given of the on-site servers 100 and 200. FIG. 4 schematically shows a configuration of the on-site server 100 so as to manage and control the meeting such as the videoconference in the on-site system 10. The on-site server 200 in the on-site system 20 has the same configuration, which is not shown.

The on-site server 100 is composed of a commonly used computer system that is connected to a network, such as a Personal Computer (PC) or a Work Station (WS). The GUI is offered in the on-site system 10 by activating a given server application on the above-mentioned computer system. The attendee of the meeting is able to set up a collaboration call and share the information by designating the shared workspace with the use of the user interface.

Referring to FIG. 4, the on-site server 100 includes an on-site server control unit 101, a sub system management unit 102, an authentication unit 103, a history management unit 104, a history display unit 105, and a communication control unit 106.

The on-site server control unit 101 controls other functional units on the on-site server 100, and also controls the video/audio server 11, the electric blackboard 12, and the card reader 13.

The sub system management unit 102 manages network addresses of the sub systems that are included in the on-site system, such as the video/audio server 11 and the electric blackboard 12, which are grounded in the site. The authentication unit 103 carries out parts of authentication procedure steps with the authentication information of the IC card 2 that has been read by the card reader 13.

The history management unit 104 stores history data by overwriting the conference material with a memo that has been written into the electric blackboard 12. The history display unit 105 displays the history data stored in the history management unit 104, on a display device. The above-mentioned functional units may be composed of software modules, which are not shown. With the software modules, it is possible to perform the parts of the authentication procedure steps in each site or manage the network addresses of the sub systems that are included in the on-site system, such as the video/audio server 11 and the electric board 12. The resources related to the conference may reside on the on-site system 10 or may be stored in another storage in the site or in a server outside the site, which are described in URL form.

Figure 5:
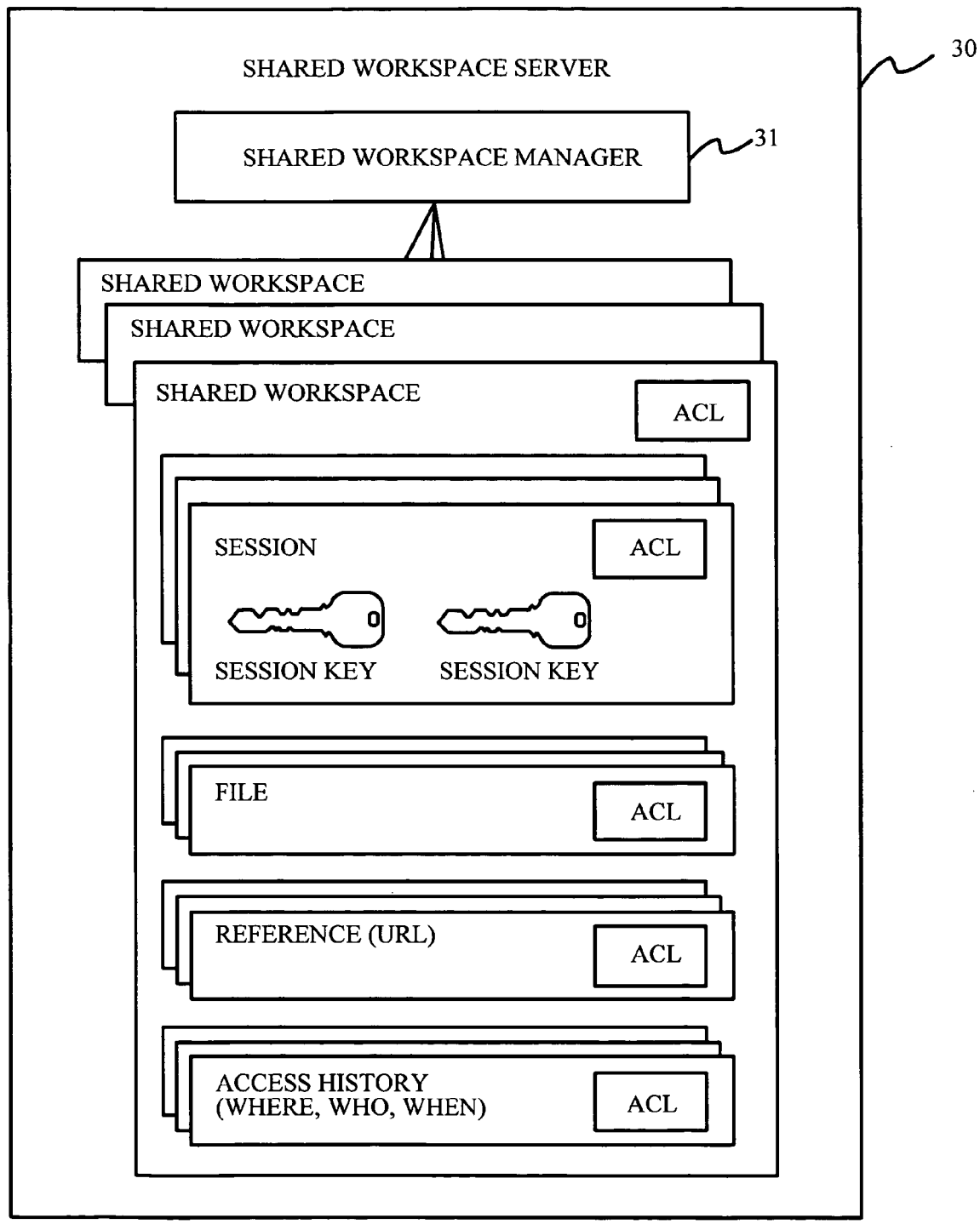
FIG. 5 schematically illustrates a data structure that is processed in a sensor server 113.

Next, referring to FIG. 5, a description will be given of the functional units of the shared workspace server 30. The shared workspace server 30 activates a given server application on the commonly used computer system such as a PC or a WS connected to the network.

The shared workspace server 30 is provided for the purpose of sharing the workspace between the sites. The workspace is used for managing and utilizing a task, which is a collaboration unit.

A workspace manager 31 manages the workspace created in each site included in the teleconference system 1.

Access control information or an access control list (hereinafter simply referred to as ACL) is provided for each workspace. The workspace manager 31 manages and controls the use of the shared workspace that is shared with multiple sites, based on the personal information or the authentication information read from the IC card 2 that is possessed by the meeting participants.

In each shared workspace, a session, the file, reference information, and the access history information are managed and controlled. The session controls a connection between the sites, that is, the on-site systems. The file is created for use in the conference or a conference record. The reference information is the resource related to the conference. The access history information includes the accesses to the file or the resource made by the conference participants.

The ACL is assigned to each session, file, reference information, and access history information in the shared workspace. Thus, the workspace manager 31 is capable of controlling and managing the use in every shared workspace, and is also capable of performing the access control between the sites in a small unit such as by the session, the file, the reference information, or the access history information in the shared workspace.

FIGS. 6A and 6B show configurations of a management table of a personal file database 32 and a shared file database 33, which are connected to the shared workspace server 30. The personal file database 32 stores personal conference materials created by the conference attendees. Referring to FIG. 6A, the personal files are stored in association with the user ID that identifies the user. The shared file database 33 stores the conference materials that are configured as the shared files so as to be shared by the conference participants. Referring to FIG. 6B, the shared files are registered in association with the conference ID that identifies the conference or meeting.

A description will now be given of the processes including that the users of the on-site systems 10 and 20 log onto the shared workspace offered by the shared workspace server 30 and start the teleconference. When the on-site servers 100 and 200 receive the certificate data from the user database 40, the on-site servers 100 accesses the shared workspace server 30 with the received certificate data. The shared workspace server 30 asks the user who is accessing the shared workspace server 30 to choose whether the user creates a new-shared workspace or logs onto an already created shared workspace. If the user selects the new-shared workspace, the on-site servers 100 and 200 respectively generate session keys and the ACLs according to instructions given by the shared workspace server 30. Then, the on-site servers 100 and 200 respectively transfer the generated session keys and the ACLs to the shared workspace server 30. The session key is a connection ID that connects to the on-site server 100 so as to attend the meeting, which is the shared workspace, held by the user in the on-site system 10. In the case where the user creates the new-shared workspace in the shared workspace server 30, the ACL is required to determine who can access this new-shared workspace. In other words, any one of the on-site servers 100 and 200 prompts the user to input a condition or parameter that allows an access to the shared workspace. Here, the on-site servers 100 and 200 may help generate the ACL by referring to the information of the user, which has been recorded in the IC card 2. For example, referring back to FIG. 3, the IC card 2 registers the company department of the user, the research theme, the conference ID that the user has attended before, and the group ID. Therefore, the on-site servers 100 and 200 may automatically generate the ACL with the above-mentioned information. That is to say, the on-site servers 100 and 200 may ask the user, "Is an access allowable from another user who has the same research theme?" and then generates the ACL according to the user's answer. If the shared workspace server 30 receives a login request having the certificate from the on-site servers 100 and 200, the shared workspace server 30 generates the new-shared workspace with the received session key.

In the case where the user selects and logs onto the already created shared workspace, the shared workspace server 30 transfers a list of the registered shared workspaces to the on-site server 100 or 200. In other words, the shared workspace server 30 receives the user information from the on-site server 100 or 200. By comparing the received user information with the ACL, the shared workspace server 30 determines whether or not the user can enter the shared workspace that is selected by the user. If the user is allowed to enter the shared workspace, the shared workspace server 30 asks any one of the on-site servers 100 and 200 that is used by the user, to generate the session key so that the user can hold the meeting with another user who desires to attend the shared workspace later. In addition, the shared workspace server 30 extracts information required for composing the GUI of the shared workspace based on the information on the designated shared workspace, and then transfers to the on-site servers 100 and 200.

Figure 7:
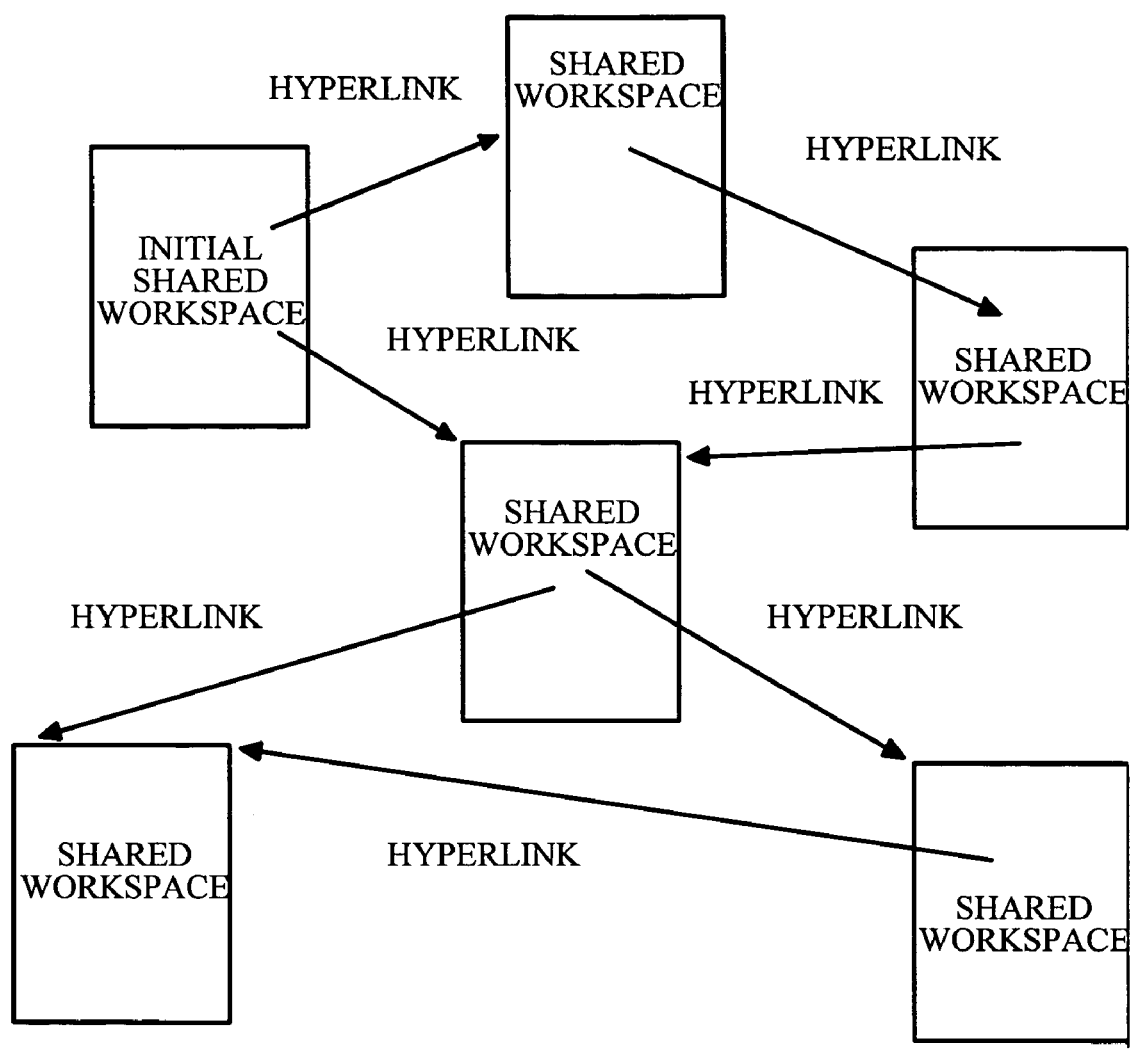
FIG. 7 schematically shows that multiple shared workspaces are linked by hyperlink.

FIG. 7 schematically shows multiple shared workspaces that are linked by hyperlink.

The shared workspace server 30 offers multiple shared workspaces and asks the user to select one of them. In this case, a part or all of any one of the following methods is used.

A navigation style of a normal hypertext is used

A menu is used

A part of or all of a graph structure composed by the shared workspace is displayed The user moves to select a desired shared workspace by selecting a node as required, according to the graph structure composed of the multiple workspaces that are offered by the shared workspace server 30.

If the shared workspace server 30 detects that another on-site system designating the same session has been added, the shared workspace server 30 determines whether the user is allowed to attend the session by comparing the user information with the ACL. If the shared workspace server 30 determines that the user is allowed to attend the session, each session key is transferred to the added on-site system so as to access the already registered on-site system. A connection topology connecting the on-site systems may be any one of the following topologies or a combination thereof.

Hub

Complete graph

Spanning tree

A user 1 in the on-site system 10 and another user 2 in the on-site system 20 select a same session A, and the session key is transferred from the shared workspace to the on-site systems, then displays start to be shared between the electric board 12 and 22 in the on-site systems 10 and 20. The user 1 and the user 2 are able to access the file required for the meeting such as the presentation document. In other words, the user 1 and the user 2 are able to access the document required for the collaboration easily.

The display is shared by hooking input and output of the application. In the case where the display is shared, a mechanism may be provided so as to show from which site an input request is made, for example, by changing colors of characters of lines, with response to the input request from the multiple sites. The reference history of a file or a resource created by the application, which has been activated by sharing the display, is stored in the shared workspace A (refer to FIG. 5).

A description will be given of a registration process and reference process of the reference history of the file or the resource.

The registration process of a history to register in Recently Used:

There is a computer that offers multiple workspaces on the network.

Each user selects a workspace or multiple workspaces on the electric blackboard or another client terminal.

Each user opens a file, and retrieve and browse information on the web (or another wide area information retrieval system)

A reference of the opened file or browsed web page is stored in the URL form in the client terminal of the user.

A reference for registering in the workspace is selected from the references stored in the client terminal of the user.

The selected reference is transferred to all the workspaces or the selected workspace. The workspace registers the received reference.

The reference process of a history to register in Recently Used:
　Each user selects one or multiple workspaces on the electric blackboard or the client terminal.
　Said each user operates to view the history of the workspace on the electric blackboard or the client terminal.
　A list of workspaces is displayed on the electric blackboard or the client terminal, with the list sorted by date, by reference count, or by importance.
　The histories of the multiple workspaces are shown in a form of "individual", "union", or "intersection".
　Each user selects the reference from the list and opens the file or browses the web.

Next, referring to FIGS. 8 through 13, a description will be given of states of the video/audio server 11 and the electric blackboard 12 that are located in the on-site system 10 and those of the video/audio server 21 and electric blackboard 22 that are located in the on-site system 20. Here, a description will be given of an operation example in the case where the same workspace is designated between the on-site system 10 and the on-site system 20, and the electric blackboards 12 and 22, which are included in the respective on-site systems, are connected, then the video/audio servers 11 and 21, which are included in the respective on-site systems, are connected.

In the above-mentioned operation example, only one session is managed in each shared workspace. The multiple on-site systems select the same shared workspace, and the on-site systems are connected and then the session starts.

Figure 8:
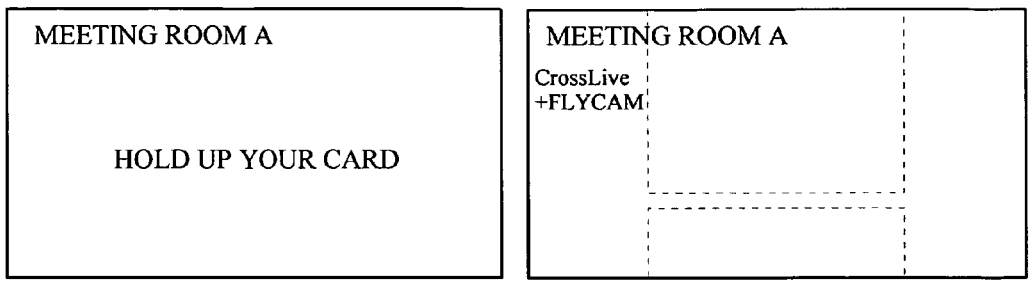
FIG. 8 shows an example of login screen with the IC card.
Figure 8:
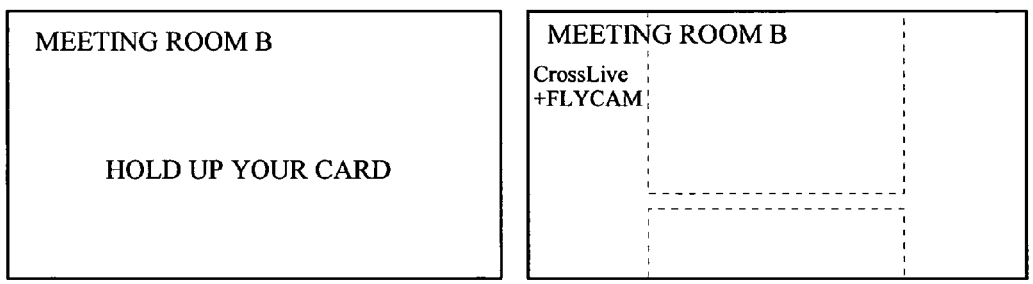
Figure 9:
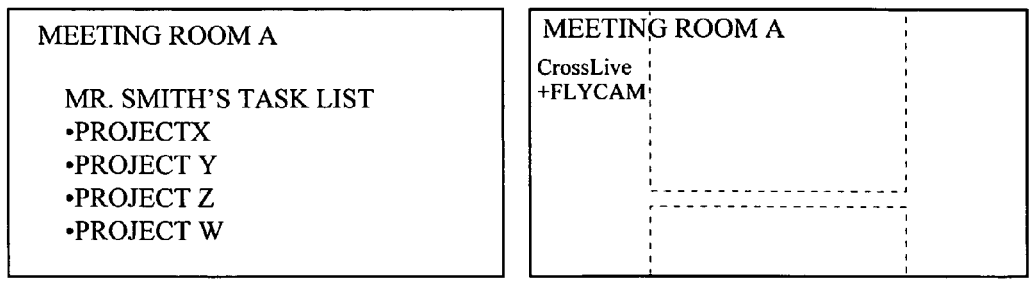
FIG. 9 shows a list of shared workspaces related to the user on a display device, by connecting the IC card to an on-site server 100 of the on-site system 10.
Figure 9:
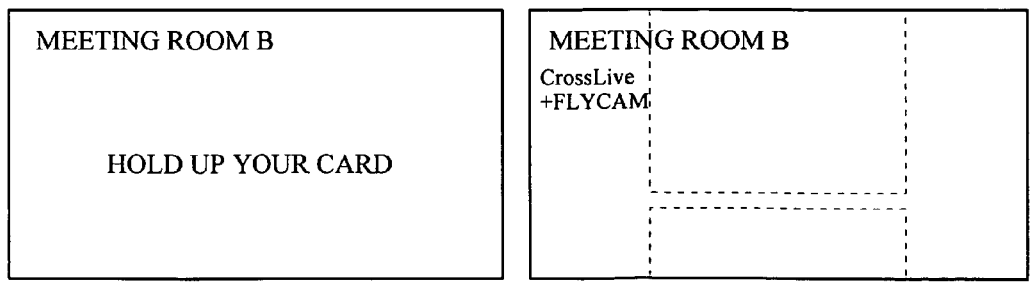

(1) Referring to FIG. 8, in the on-site systems 10 and 20, a login screen is displayed with the use of the IC card 2, as initial screens of the electric blackboards 12 and 22 (or on the user's client terminal). When the IC card 2 is connected to the on-site server 100 in the on-site system 10, the card reader 13 reads the authentication data, and transfers to the user database 40. The user database 40 performs the user authentication with the transferred authentication data. If the authentication is successful, the authentication data is transferred to the on-site server 100. The on-site server 100 logs onto the shared workspace server 30 with the certificate data, and then the list of the shared workspaces is displayed on the electric blackboard 12 of the on-site system 10 in the shared workspace server 30, referring to FIG. 9.

(2) Here, the user is assumed to select the shared workspace named "Project X" from the multiple workspaces displayed on the electric blackboard 12.

(3) The on-site system 10 sends the reference of the shared workspace selected by the user and the user information, to the shared workspace server 30.

(4) The shared workspace server 30 determines whether or not the user in the on-site system 10 is an authenticated user of the "Project X", referring to the ACL set up in the shared workspace. If the user is determined to be an authenticated user of the "Project X" judging from the ACL, the list of file references that is retained by the shared workspace is transmitted to the on-site server 100.

(5) The shared workspace server 30 makes it possible to connect the on-site servers that select the Project X in the shared workspaces, and requests a generation of the session key to the on-site server 100. The session key generated by the on-site server 100 is registered in the shared workspace on the shared workspace server 30, referring back to FIG. 5.

Figure 10:
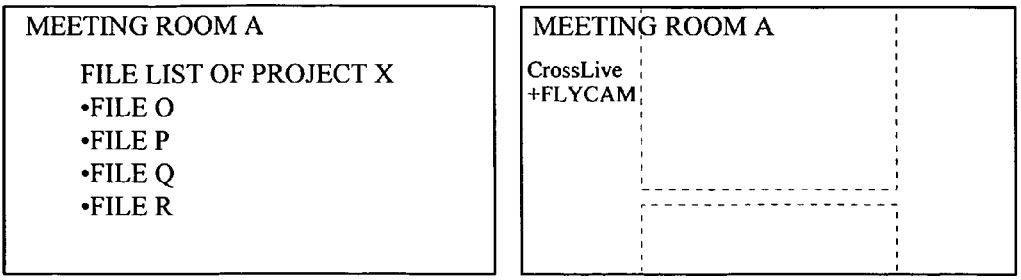
FIG. 10 shows a list of file references included in a project X on an electric blackboard.
Figure 10:
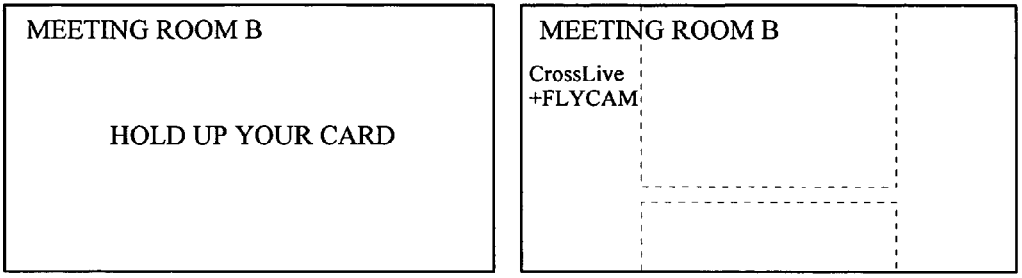
Figure 11:
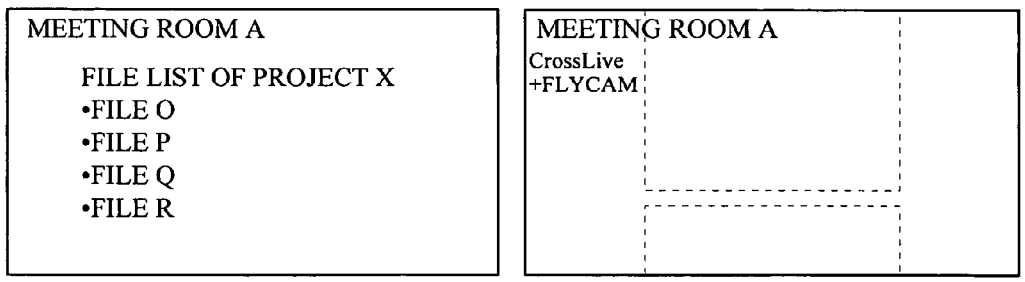
FIG. 11 shows another list of shared workspaces related to another user on a display device, when said another user connects the IC card to an on-site server 200 of an on-site system 20.
Figure 11:
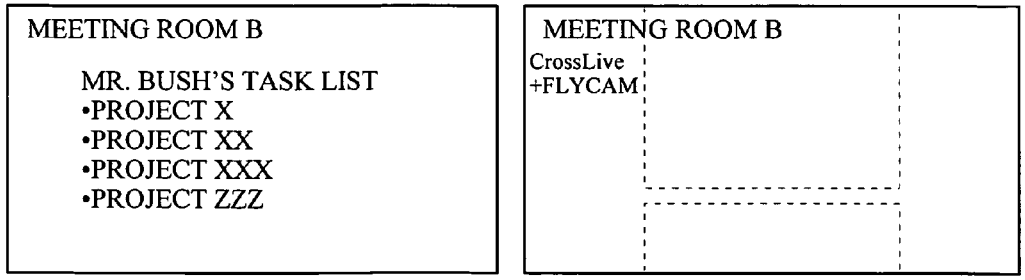
Figure 12:
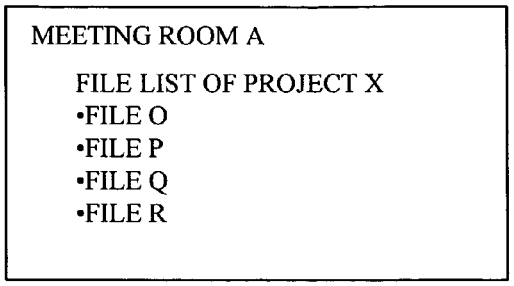
FIG. 12 shows how image and sound data is output on electric blackboards 12 and 22 in each site, the image and sound data having been received from an image server in another site.
Figure 12:
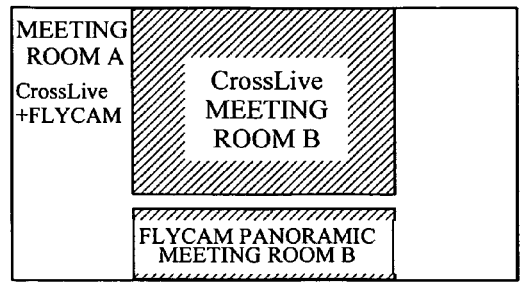
Figure 12:
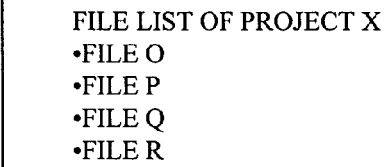
Figure 12:
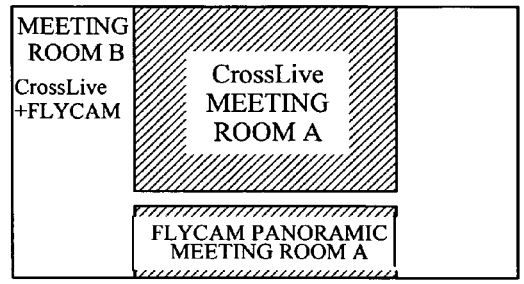

(6) The on-site server 100 displays the reference list of the transmitted files on the electric blackboard 12, referring to FIG. 10.

(7) If another user connects the IC card 2 to the on-site server 200 in the on-site system 20 that corresponds to a meeting room B, an authentication is performed with the user database 40. When the authentication is successful and the certificate data is acquired from the user database 40, the on-site system 20 logs onto the shared workspace server 30 with the acquired certificate data. Then, the list of the shared workspaces that is retained on the shared workspace server 30 is displayed on the electric blackboard 22 in the on-site system 20, referring to FIG. 11.

(8) Here, said another user selects the workspace named "Project X" from the multiple workspaces displayed on the electric blackboard 22.

(9) In response to this selection operation, the on-site server 200 transfers the user information in the on-site system 20, to the shared workspace server 30. The shared workspace server 30 determines whether said another user in the on-site system 20 is allowed to use the "Project X" by referring to the ACL set up in the shared workspace. If said another user is determined to be an authenticated user of the "Project X", the reference list of the files retained by a shared workspace 1 is transmitted to the on-site server 200.

(10) The shared workspace server 30 makes it possible to connect the on-site servers that have selected the Project X in the shared workspace, and retains the network address of the on-site server 200. The on-site systems 10 and 20 can be connected to the session key generated by the on-site server 100. However, if still another user in another on-site system also selects the "Project X", said another on-site system and the on-site system 20 cannot be connected. This is the reason why the shared workspace server 30 requests the generation of the session key to the on-site server 200. The session key generated by the on-site server 200 is registered in the shared workspace in the shared workspace server 30.

(11) The on-site servers 100 and 200 respectively issue requests to connect both video/audio servers 11 and 21, connect the electric blackboards 12 and 22 to the shared workspace server 30, and start sharing the input and output of the application.

(12) In accordance with the first embodiment of the present invention, the on-site system 10 retains the video/audio servers 11, and the on-site system 20 retains the video/audio servers 21. The on-site server 100 sends a request to the video/audio server 11 to receive the images and voices from the video/audio server 21. In the same manner, the on-site server 200 sends a request to the video/audio server 21 to receive the images and voices from the video/audio server 11.

Figure 13:
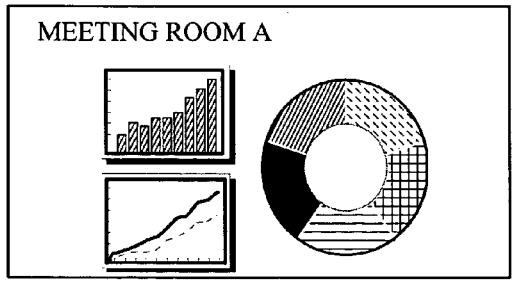
FIG. 13 shows how information on a screen display is output on the electric blackboards 12 and 22 in each site, the information on the screen display having been received from the shared workspace server 30.
Figure 13:
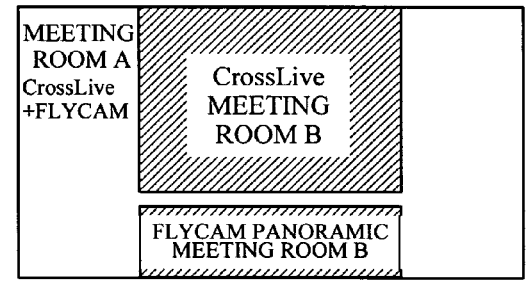
Figure 13:
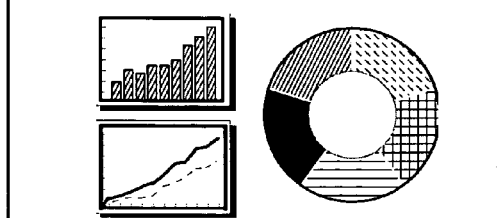
Figure 13:
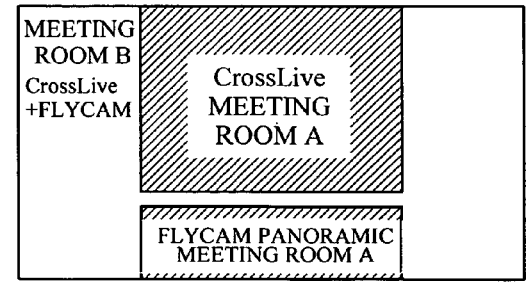

(13) Then, the video/audio server 11 starts receiving the image and voice from the video/audio server 21, and the video/audio server 21 starts receiving the image and voice from the video/audio server 11. FIG. 13 shows that the video and audio data, which has been received from the video/audio server on said another site, is outputted to the electric blackboards 12 and 22 in the site.

(14) Here, the user is supposed to select a file P with the GUI displayed on the electric blackboard 12 in the on-site system 10. In response to this, the file and the application related thereto are activated on the shared workspace server 30.

(15) The shared workspace server 30 transfers the screen displayed by the application to the electric blackboards 12 and 22 in the on-site system 10 and 20.

(16) The electric blackboards 12 and 22 display the screen of the application, based on the information of the screen display received from the shared workspace server 30. FIG. 13 shows the information of the screen display transmitted from the shared workspace server 30.

(17) The users in the on-site systems 10 and 20 get on with the meeting and exchange information on the electric blackboards 12 and 22, with the use of user input devices such as a keyboard or a pointing device and the video/audio servers 11 and 21.

(18) The user who operates the electric blackboard 12 issues an instruction of an end of the application, the file that has been used in the application is stored in the shared workspace. The file may be stored in a file server, not shown, which is designated by the reference on the shared workspace.

(19) The on-site server 200 issues an instruction of a logout and an end of the use from the on-site server 200, when the user connects the IC card 2. Thus, the on-site server 220 closes the session.

(20) The on-site server 100 issues an instruction of a logout and an end of the system usage from the on-site server 100, when the user removes the IC card 2 to the outside the scope that can be read by the card reader 13.

Next, a description will be given of the above-mentioned procedure in detail. First, referring to FIG. 14, the authentication procedure is performed by the user with the use of the IC card 2 so as to use the teleconference system 1. Hereinafter, the operation of the on-site system 10 will be described, however, the on-site system 20 operates in the same manner.

Before using the teleconference system 1, the user needs to have the IC card 2 read by the card reader 13 for the authentication to log onto the system. The IC card 2 stores the user information or the authentication data as shown in FIG. 3.

The IC card reader 13 reads card information from the IC card 2 and sends the information to the on-site server 100. The on-site server 100 stores the card information that has been read by the card reader 13 in the authentication unit 103, and sends the authentication data to the user database 40 by way of the communication control unit 106. The user database 40 stores the data that authenticates authorized users of the teleconference system 1. For instance, the private key, which has been issued by the certification organization, is stored in the database 40 so as to determine whether or not the user is a normal user by authenticating with the public key that has been read from the IC card 2. If the authentication is successful, the certificate data is transmitted to the on-site server 100. The certificate data certifies that the user is an authorized user and is allowed to use the system.

If the authentication is successful, the on-site server 100 logs onto the shared workspace server 30 with the certificate data that has been sent from the user database 40. When the shared workspace server 30 receives a login request with the certificate from the on-site server 100, the shared workspace server 30 receives this request. The shared workspace server 30 receives the login request, and sends screen data for selecting a file, to the on-site server 100. In contrast, the user in the on-site server 100 generates the shared workspace newly, and transmits a registration request to the shared workspace server 30. If the shared workspace server 30 receives a new creation request of the shared workspace, the shared workspace server 30 asks the on-site server 100 to generate the session key and the ACL. The on-site server 100 generates the session key and the ACL to register them in the shared workspace server 30.

Figure 15:
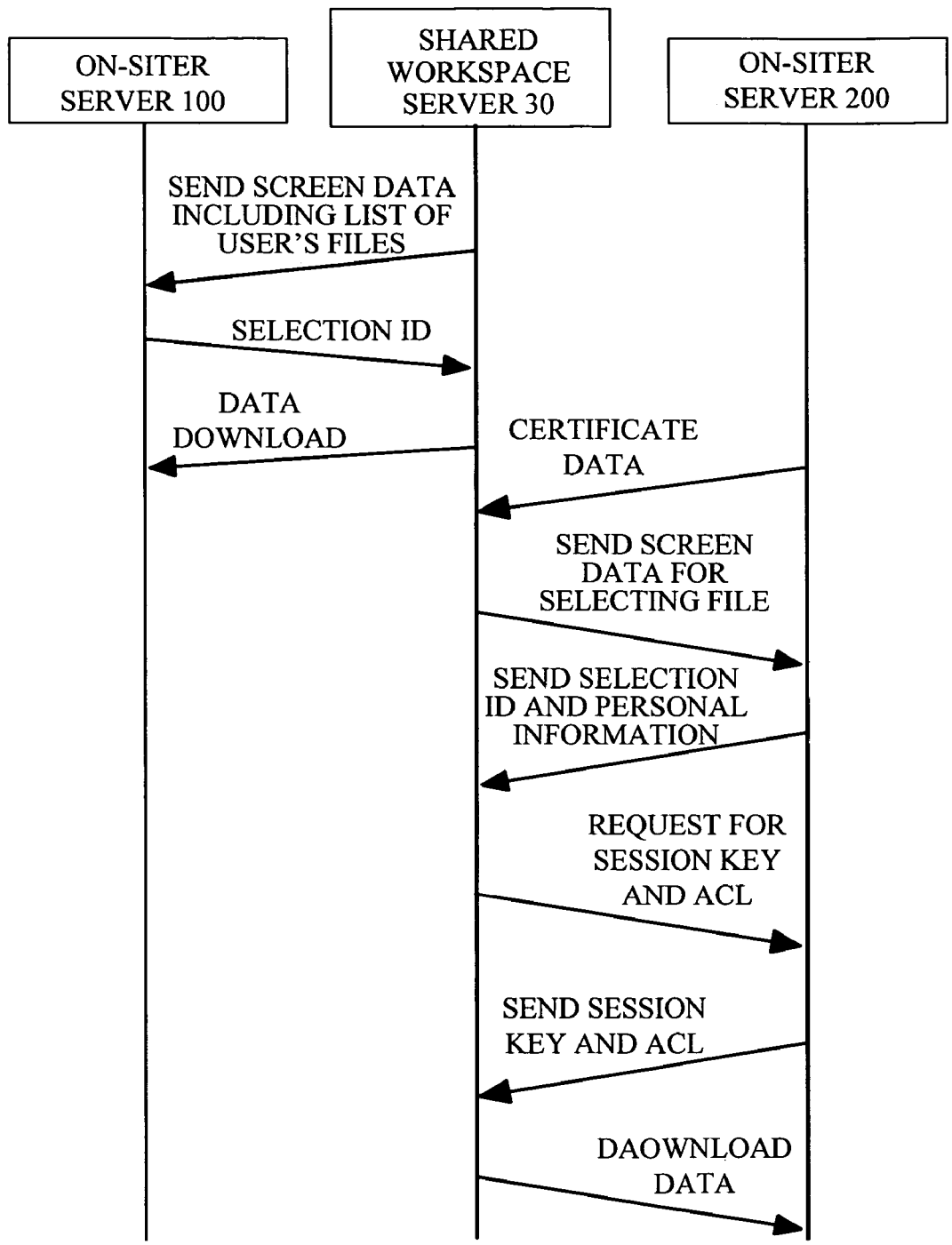
FIG. 15 shows a procedure to acquire desired data from the shared workspace server 30.

Next, referring to FIG. 15, a description will be given of a communication procedure to conduct the teleconference while displaying an identical file on the on-site servers 100 and 200. The on-site server 100 is assumed to log onto the shared workspace server 30 as described above and display the file on the electric blackboard 12.

When the user of the on-site system 20 connects the IC card 2 to the on-site server 200, the authentication is performed with the user database 40. If the authentication is successful and the certificate data is obtained from the user database 40, the on-site system 20 logs onto the shared workspace server 30 with the obtained certificate data. The list of the shared workspaces retained by the shared workspace server 30 is displayed on the electric blackboard 22 in the on-site system 20, by logging onto the shared workspace server 30.

Then the user in the on-site system 20 selects one from the multiple shared workspaces displayed on the electric blackboard 22. The on-site server 200 transmits a selection ID for selecting the shared workspace and the user information, to the shared workspace server 30.

The shared workspace server 30 determines whether or not the user in the on-site system 20 is an authorized user of the shared workspace, referring to the ACL set up in the shared workspace. With the ACL, once the user is determined to be an authorized user of the shared workspace that has been selected by the user, the shared workspace server 30 sends the reference of the file retained by the selected shared workspace, to the on-site server 200.

The shared workspace server 30 retains the network address of the on-site server 200 so that the selected shared workspace can be connected from another on-site server. The shared workspace server 30 requests a generation of the session key to the on-site server 200. The session key generated by the on-site server 200 is registered in the shared workspace in the shared workspace server 30.

Second Embodiment

Figure 16:
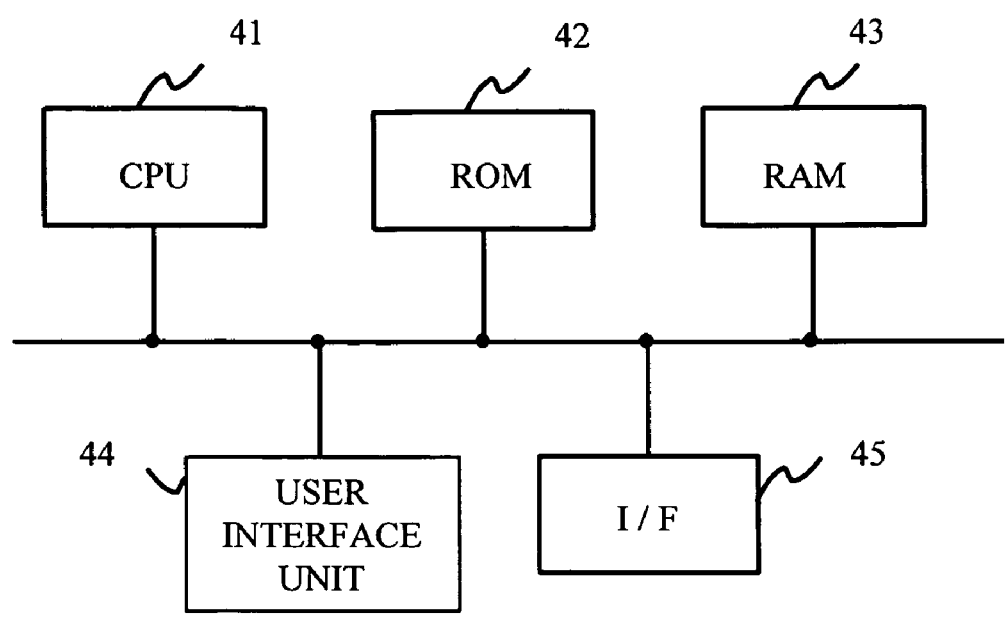
FIG. 16 shows a configuration of processing units including the shared workspace server 30, and on-site servers 100 and 200.

Next, a description will be given of a second embodiment of the present invention, with referring to drawings. The second embodiment of the present invention relates to a teleconference management program. FIG. 16 shows a configuration of processing units including the shared workspace server 30, and the on-site servers 100 and 200. These processing units, which include a CPU 41, a ROM 42, a RAM 43, an user interface unit 44, and an I/F unit 45, are connected over a bus. The ROM 42 stores a history data storage program. The RAM 43 serves as a work area of the CPU. The I/F unit 45 serves as a connection means with external devices.

Figure 14:
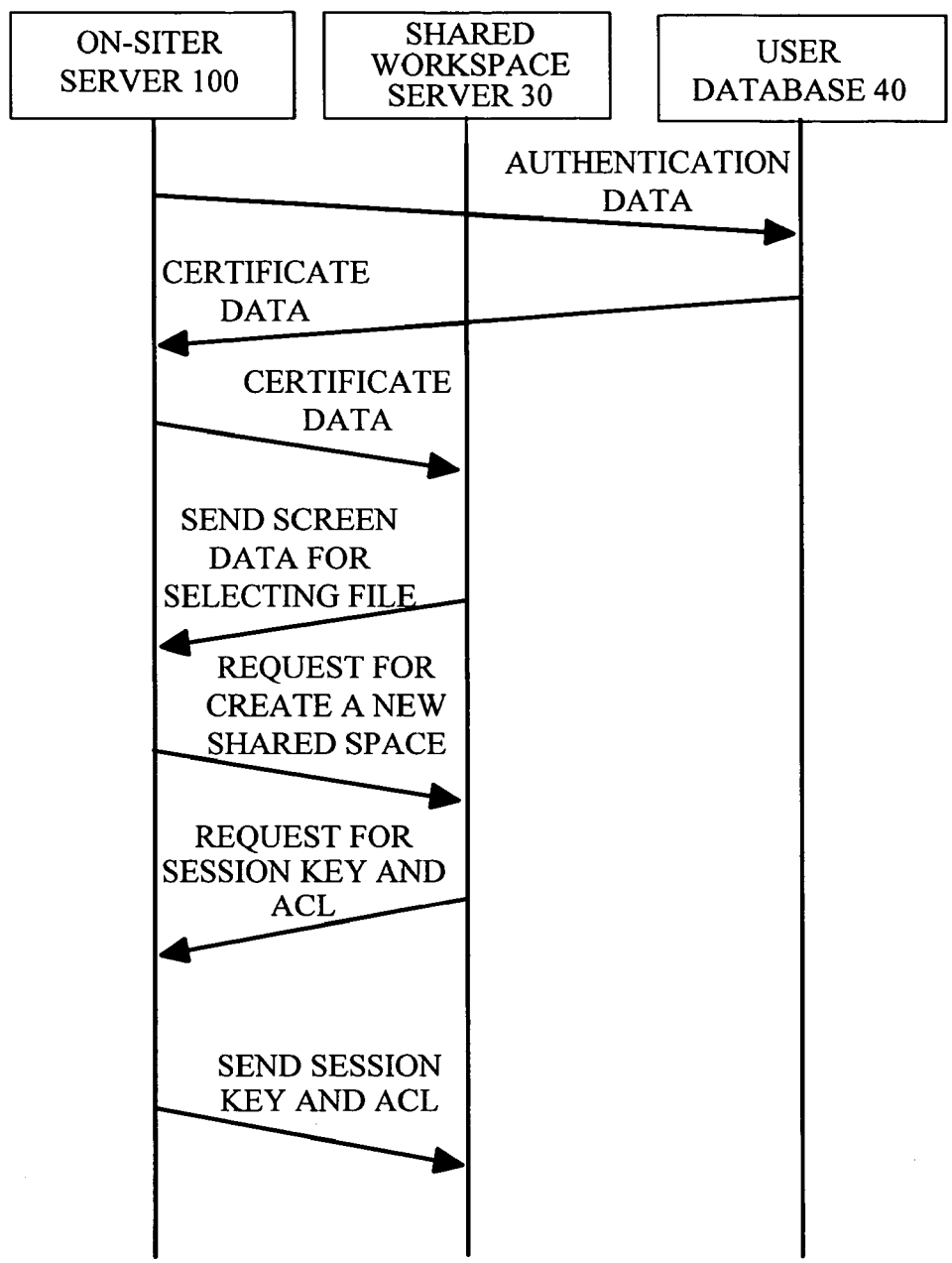
FIG. 14 shows a login procedure to log onto the shared workspace server and authentication process with authentication data of the IC card.

The CPUs 41 in the on-site servers 100 and 200 operate according to programs read out of the ROM 42. The CPU 41, according to the program, performs the authentication as shown in FIG. 14, sets up the shared workspace, and registers the session key and the ACL that have been sent from the on-site servers 100 and 200, in the shared workspace. The CPU 41 selects the shared workspace shown in FIG. 15 and displays the file provided for the shared workspace on the electric blackboards 12 and 22.

Another CPU 41 on the shared workspace server 30 operates according to the program read from the ROM 42. The CPU 41 registers the session key and the ACL that have been sent from the on-site servers 100 and 200, in the shared workspace. The second embodiment of the present invention is thus capable of obtaining the same effects as the first embodiment of the present invention.

On the above-mentioned teleconference system the on-site server may register access control information that limits an authorized user of the shared workspace. By registering the access control information, it is possible to limit allowable users who can access the share workspace.

On the above-mentioned teleconference system, the teleconference system further includes a user database that stores user information to identify the user, and authenticates user information transferred from the on-site server based on the user information in the user database. The user database transfers to the on-site server, certificate data that allows an access to the management server, if the authentication is successful. The user database, which is able to determine whether the user is an allowable on, can restrict unauthorized access to enhance the security.

On the above-mentioned teleconference system, the teleconference system may further include the on-site server generates the access control information with information stored in an information storing medium, and the information storing medium stores the information to identify the user. Thus, it is possible to shorten the time to create access control information and reduce the burden of the user.

On the above-mentioned teleconference system, preferably, the on-site server may further includes an information reader that reads information from an information storing medium, the information storing medium stores the information to identify the user. The information read by the information reader is transferred to the user database. User information is stored in the information storing medium, and after reading the stored user information, the authentication process is carried out readily.

On the above-mentioned teleconference system, the teleconference system may further include a third part that registers in the management server, access control information that limits a user who is allowed to participate in the collaboration. The access control information is registered to limit authorized users who are allowed to access the shared workspace server. It is thus possible to limit the authorized users who can access the shared workspace server.

On the above-mentioned teleconference system, the teleconference system may further include a fourth part that registers, in the shared workspace, an access control information that limits a user who is allowed to use the shared workspace, the access control information being transferred from the on-site server that uses the shared workspace. The access control information is registered to limit authorized users who are allowed to access the shared workspace server. It is thus possible to limit the authorized users who can access the shared workspace server.

On the above-mentioned teleconference system, the teleconference system may further include registering, in the shared workspace, an access control information that limits a user who is allowed to use the shared workspace. It is thus possible to limit the authorized users who can access the shared workspace server.

On the above-mentioned teleconference system, the teleconference system may further includes registering, in the shared workspace, an access control information that limits a user who is allowed to use the shared workspace 14. The teleconference system as claimed in claim 1, wherein the shared workspace is controlled and managed in every shared workspace.

On the above-mentioned teleconference system, the access control information may limit the authorized user in a small unit as by a session, a file, reference information, or access history information in the shared workspace.

On the above-mentioned teleconference system, a reference history of a file or a resource used by the user may be stored in the shared workspace.

Although a few preferred embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2004-276555 filed on Sep. 24, 2004 including specification, claims, drawings, and abstract is incorporated herein by reference in its entirety.

What is claimed is:

1. A teleconference system comprising:
an on-site server, having a processor, provided in a site to control a device in the site;
a management server that connects a plurality of sites to generate a shared workspace, the shared workspace managing a task to realize collaboration between a plurality of the on-site servers; and
a user database that stores user information to identify a user and authenticates user information transferred from the on-site server based on the user information in the user database, wherein:
the on-site server registers access control information that limits a user who is allowed to use the shared workspace, in the shared workspace,
the user database transfers to the on-site server, certificate data that allows an access to the management server, if the authentication is successful,
the on-site server logs onto the management server with the certificate data and sends the user information to the management server when the shared workspace is selected by a user of the on-site server,
the management server determines whether or not the user of the on-site server is an authenticated user of the shared workspace by referring to the access control information and the sent user information, and transmits a list of file references that is retained by the shared workspace to the on-site server when the user of the on-site server is determined to be the authenticated user of the shared workspace,
when the management server requests a generation of a session key from the on-site server, the on-site server generates the session key for connecting to the on-site server and registers the session key in the shared workspace to be connected by another on-site server, and
the session key is transferred from the management server to the another on-site server when the another on-site server is to be connected to the on-site server in order to utilize the shared workspace generated by the management server.

2. The teleconference system as claimed in claim 1, wherein the on-site server generates the access control information with information stored in an information storing medium, and the information storing medium stores information to identify the authorized user.

3. The teleconference system as claimed in claim 1, further comprising an information reader that reads information from an information storing medium, the information storing medium stores the information to identify the user,
wherein the information read by the information reader is transferred to the user database.

4. An on-site server, having a processor, that controls a device provided in a site, comprising:
a first part that generates a session key that is used for accessing the on-site server;
a second part that registers the session key in a shared workspace of a management server that manages collaboration between a plurality of on-site servers; and
a third part that registers in the management server, access control information that limits a user who is allowed to participate in the collaboration, wherein:
a user database, that stores user information to identify a user and authenticates user information transferred from the on-site server based on the user information in the user database, transfers to the on-site server, certificate data that allows an access to the management server, if the authentication is successful, the on-site server logs onto the management server with the certificate data and sends the user information to the management server when the shared workspace is selected by a user of the on-site server, the management server determines whether or not the user of the on-site server is an authenticated user of the shared workspace by referring to the access control information and the sent user information, and transmits a list of file references that is retained by the shared workspace to the on-site server when the user of the on-site server is determined to be the authenticated user of the shared workspace, the first part generates the session key when the management server requests the generation of the session key from the on-site server, and the session key is transferred from the management server to another on-site server when the another on-site server is to be connected to the on-site server in order to utilize the shared workspace generated by the management server.

5. A management server, having a processor, that manages collaboration between a plurality of on-site servers in respective sites, comprising:

a first part that connects the on-site servers over a network, the on-site servers that controls a device provided in the respective sites;

a second part that generates a shared workspace to manage a task that realizes collaboration between the on-site servers;

a third part that registers a session key in the shared workspace, the session key being transferred from an on-site server that uses the shared workspace, and the session key being used for connecting to the on-site server; and a fourth part that registers. in the shared workspace, access control information that limits a user who is allowed to use the shared workspace, the access control information being transferred from the on-site server that uses the shared workspace, wherein:

a user database, that stores user information to identify a user and authenticates user information transferred from the on-site server based on the user information in the user database, transfers to the on-site server, certificate data that allows an access to the management server, if the authentication is successful, the on-site server logs onto the management server with the certificate data and sends the user information to the management server when the shared workspace is selected by a user of the on-site server, the management server determines whether or not the user of the on-site server is an authenticated user of the shared workspace by referring to the access control information and the sent user information, and transmits a list of file references that is retained by the shared workspace to the on-site server when the user of the on-site server is determined to be the authenticated user of the shared workspace, the session key is generated by the on-site server when the management server requests the generation of the session key from the on-site server, and the session key is transferred from the management server to another on-site server when the another on-site server is to be connected to the on-site server in order to utilize the shared workspace generated by the management server.

6. A teleconference management method of an on-site server that controls a device provided in a site, the method comprising:

generating, via a processor, a session key that is used for accessing the on-site server;

registering the session key in a shared workspace of a management server that manages a task to realize collaboration between on-site servers;

registering in the management server, access control information that limits a user who is allowed to participate in the collaboration;

receiving certificate data that allows an access to the management server from a user database that stores user information to identify a user and authenticates user information transferred from the on-site server based on the user information in the user database, if the authentication is successful;

logging onto the management server with the certificate data and sending the user information to the management server when the shared workspace is selected by a user of the on-site server; and transferring the session key from the management server to another on-site server when the another on-site server is to be connected to the on-site server in order to utilize the shared workspace generated by the management server, wherein:

the management server determines whether or not the user of the on-site server is an authenticated user of the shared workspace by referring to the access control information and the sent user information, and transmits a list of file references that is retained by the shared workspace to the on-site server when the user of the on-site server is determined to be the authenticated user of the shared workspace, and the session key is generated when the management server requests the generation of the session key from the on-site server.

7. A non-transitory storage medium readable by a computer to execute a process that an on-site server controls a device provided in a site, the process comprising:

generating a session key that is used for accessing the on-site server;

registering the session key in a shared workspace of a management server that manages tasks to realize collaboration between on-site servers;

registering in the management server, access control information that limits a user who is allowed to participate in the collaboration;

receiving certificate data that allows an access to the management server from a user database that stores user information to identify a user and authenticates user information transferred from the on-site server based on the user information in the user database, if the authentication is successful;

logging onto the management server with the certificate data and sending the user information to the management server when the shared workspace is selected by a user of the on-site server; and transferring the session key from the management server to another on-site server when the another on-site server is to be connected to the on-site server in order to utilize the shared workspace generated by the management server, wherein:

the management server determines whether or not the user of the on-site server is an authenticated user of the shared workspace by referring to the access control information and the sent user information, and transmits a list of file references that is retained by the shared workspace to the on-site server when the user of the on-site server is determined to be the authenticated user of the shared workspace, and the session key is generated when the management server requests the generation of the session key from the on-site server.

8. The teleconference system as claimed in claim 1, wherein the shared workspace is controlled and managed in every shared workspace.

9. The teleconference system as claimed in claim 1, wherein the access control information limits the authorized user in a small unit as by a session, a file, reference information, or access history information in the shared workspace.

10. The teleconference system as claimed in claim 1, wherein a reference history of a file or a resource used by a user is stored in the shared workspace.

* * * * *